United States Patent
Vitunic et al.

(10) Patent No.: US 10,615,626 B2
(45) Date of Patent: Apr. 7, 2020

(54) OPEN CIRCUIT-BASED RX POWER LIMITER FOR WIRELESS POWER TRANSFER

(71) Applicant: LINEAR TECHNOLOGY HOLDING LLC, Norwood, MA (US)

(72) Inventors: Mark R. Vitunic, Lexington, MA (US); Eko T. Lisuwandi, Andover, MA (US)

(73) Assignee: Linear Technology Holding LLC, Norwood, MA (US)

( * ) Notice: Subject to any disclaimer, the term of this patent is extended or adjusted under 35 U.S.C. 154(b) by 6 days.

(21) Appl. No.: 15/672,243

(22) Filed: Aug. 8, 2017

(65) Prior Publication Data
US 2019/0052112 A1    Feb. 14, 2019

(51) Int. Cl.
  *H02J 7/02*   (2016.01)
  *H04B 5/00*   (2006.01)
  *H02J 50/80*  (2016.01)
  *H02J 50/10*  (2016.01)
  *H02M 7/06*   (2006.01)

(52) U.S. Cl.
  CPC ............. *H02J 7/025* (2013.01); *H02J 50/10* (2016.02); *H02J 50/80* (2016.02); *H02M 7/062* (2013.01); *H04B 5/0037* (2013.01)

(58) Field of Classification Search
  CPC .......... H02J 7/025; H02J 50/80; H04B 5/0037
  USPC ....................................................... 320/108
  See application file for complete search history.

(56) References Cited

U.S. PATENT DOCUMENTS

| | | | | |
|---|---|---|---|---|
| 5,052,230 A | * | 10/1991 | Lang ...................... | G01F 1/667 73/861.28 |
| 6,522,558 B2 | * | 2/2003 | Henry ..................... | H02M 3/07 327/536 |
| 6,528,928 B1 | * | 3/2003 | Burns .................... | H02N 2/181 310/339 |

(Continued)

FOREIGN PATENT DOCUMENTS

| | | |
|---|---|---|
| CN | 109391134 A | 2/2019 |
| DE | 102018006143 A1 | 2/2019 |

(Continued)

OTHER PUBLICATIONS

"Chinese Application Serial No. 201810863744.4, Amendment filed Aug. 10, 2018", W/O English Translation, 3 pgs.

(Continued)

*Primary Examiner* — M Baye Diao
(74) *Attorney, Agent, or Firm* — Schwegman Lundberg & Woessner, P.A.

(57) ABSTRACT

A wireless power transfer system may wirelessly transmit and receive power. A transmitting coil may wirelessly transmit the power. A receiving coil may be magnetically but wirelessly coupled to the transmitting coil and may wirelessly receive the power and generate an AC input voltage. A rectifier may rectify the AC input voltage. A capacitance may filter the rectified AC input voltage. An electronic switch may be connected in series between the rectified AC input voltage and an output. A load may be connected to the output. A controller may open and close the electronic switch so as to cause the output to be at a constant DC voltage, notwithstanding variations in the load.

24 Claims, 5 Drawing Sheets

(56) References Cited

U.S. PATENT DOCUMENTS

| | | | |
|---|---|---|---|
| 6,828,762 B2* | 12/2004 | Brkovic | H02M 3/28 |
| | | | 323/222 |
| 7,304,460 B2* | 12/2007 | Park | H02M 1/36 |
| | | | 323/282 |
| 8,754,624 B2* | 6/2014 | Sato | H02M 1/32 |
| | | | 323/281 |
| 9,059,634 B2* | 6/2015 | Rinaldi | H02M 5/257 |
| 9,664,714 B2* | 5/2017 | Chen | G01R 19/0007 |
| 9,846,196 B2* | 12/2017 | Vitunic | G01R 31/3617 |
| 9,983,254 B2* | 5/2018 | McCammon | G01R 31/021 |
| 10,027,223 B1* | 7/2018 | Zhang | H02M 3/07 |
| 2002/0027467 A1* | 3/2002 | Henry | H02M 3/07 |
| | | | 327/536 |
| 2002/0060914 A1* | 5/2002 | Porter | E02D 7/26 |
| | | | 363/21.01 |
| 2014/0054970 A1* | 2/2014 | Keeling | B60L 53/36 |
| | | | 307/104 |
| 2014/0225458 A1* | 8/2014 | Rehm | H02J 5/005 |
| | | | 307/149 |
| 2016/0226296 A1 | 8/2016 | Bae et al. | |
| 2016/0294180 A1 | 10/2016 | Pagano et al. | |
| 2017/0358953 A1* | 12/2017 | Trudeau | H02J 50/12 |
| 2018/0205315 A1* | 7/2018 | Giuliano | H02M 3/07 |

FOREIGN PATENT DOCUMENTS

| | | |
|---|---|---|
| JP | 2009044918 A | 2/2009 |
| JP | 2010086433 A | 4/2010 |
| JP | 2014073049 A | 4/2014 |
| JP | 2016067122 A | 4/2016 |
| JP | 2016534705 A | 11/2016 |

OTHER PUBLICATIONS

"Chinese Application Serial No. 201810863744.4, Voluntary Amendment Filed Jun. 21, 2019", w/o English Translation, 12 pgs.

"Japanese Application Serial No. 2018-146711, Office Action dated Jun. 24, 2019", W/ English translation, 7 pgs.

"Japanese Application Serial No. 2018-146711, Response filed Sep. 20, 2019 to Office Action dated Jun. 24, 2019", w/ English Claims, 9 pgs.

"Japanese Application Serial No. 2018-146711, Notification of Reasons for Rejection dated Dec. 2, 2019", w/ English Translation, 5 pgs.

* cited by examiner

OPEN CIRCUIT-BASED RX POWER LIMITER FOR WIRELESS POWER TRANSFER

BACKGROUND

Technical Field

This disclosure relates to wireless power transfer systems, including wireless power transfer systems used to wirelessly charge mobile phones, hearing aids, medical devices, power tools, smart cards, fitness devices, battery-powered wearables, virtual reality headsets, aviation headsets, IOT (Internet of Things) clients, portable military equipment, moving and/or rotating equipment, etc.

Description of Related Art

A wireless power transfer system may have two sections separated by an air gap: (1) transmitter (Tx) circuitry including a transmit coil; and (2) receiver (Rx) circuitry including a receive coil.

On the transmitter side, an AC magnetic field may be generated in the transmit coil, which may then induce an AC current in the receive coil. This may be similar to a transformer. In a wireless power system, however, an air gap (or gap with other non-magnetic or non-conductive material) may separate the primary side (Tx) from the secondary side (Rx).

The electromagnetic coupling between the transmit and the receive coils in a wireless power system may also be very weak. A coupling coefficient of 0.95 to 1 may be common in a transformer. But the coupling coefficient in a wireless power transfer system can vary widely, such as from a high of 0.8 to a low of 0.05.

In a wireless power transfer system, the magnetic field at the transmit coil may need to be strong enough to ensure that sufficient power can be delivered to the receiver load under worst-case coupling conditions. However, under best-case coupling conditions, the strong resulting magnetic field at the receiver may produce too much receive-side power. This excess power may need to be reduced to prevent damage to the receiver.

Two-way communication between the Tx and the Rx circuitry can be used to address this concern. Specifically, the Rx can tell the Tx when it is receiving too much power. An example of such a system is the Qi standard. But this approach can be unduly costly, complex, and/or inflexible.

Another approach shunts excess power on the receive-side. This may protect the receiver, but this may result in excessive heat in the Rx and wasted energy, both of which may be problematic.

SUMMARY

A circuit in a wireless power transfer system may receive a wirelessly-generated input voltage at an input and produce a constant DC voltage at an output to drive a load. An electronic switch may be connected in series between the input and the output. A controller may open and close the electronic switch so as to cause the output to be at the constant DC voltage, notwithstanding variations in the input voltage of greater than 100% and variations in the load.

A wireless power transfer system may wirelessly transmit and receive power. A transmitting coil may wirelessly transmit the power. A receiving coil may be magnetically but wirelessly coupled to the transmitting coil and may wirelessly receive the power and generate an AC input voltage. A rectifier may rectify the AC input voltage. A capacitance may filter the rectified AC input voltage. An electronic switch may be connected in series between the rectified AC input voltage and an output. A controller may open and close the electronic switch so as to cause the output to be at a constant DC voltage, notwithstanding variations in the load.

These, as well as other components, steps, features, objects, benefits, and advantages, will now become clear from a review of the following detailed description of illustrative implementations, the accompanying drawings, and the claims.

BRIEF DESCRIPTION OF DRAWINGS

The drawings are of illustrative implementations. They do not illustrate all implementations. Other implementations may be used in addition or instead. Details that may be apparent or unnecessary may be omitted to save space or for more effective illustration. Some implementations may be practiced with additional components or steps and/or without all of the components or steps that are illustrated. When the same numeral appears in different drawings, it refers to the same or like components or steps.

FIGS. 3A and 3B illustrate examples of a waveform across a receiving coil in the receive side of the wireless power transfer system illustrated in FIG. 2. FIG. 3A illustrates the waveform when no power is shunted, while

FIGS. 6A and 6B illustrate examples of a waveform across a receiving coil in the receive side of the wireless power transfer system illustrated in FIG. 4. FIG. 6A illustrates the waveform when the PMOS electronic switch is closed, while

FIGS. 9A and 9B illustrate examples of a waveform across a receiving coil in the receive side of the wireless power transfer system illustrated in FIG. 7. FIG. 9A illustrates the waveform when the NMOS electronic switch is closed, while

DETAILED DESCRIPTION OF ILLUSTRATIVE IMPLEMENTATIONS

Illustrative implementations are now described. Other implementations may be used in addition or instead. Details that may be apparent or unnecessary may be omitted to save space or for a more effective presentation. Some implementations may be practiced with additional components or steps and/or without all of the components or steps that are described.

Figure 1:
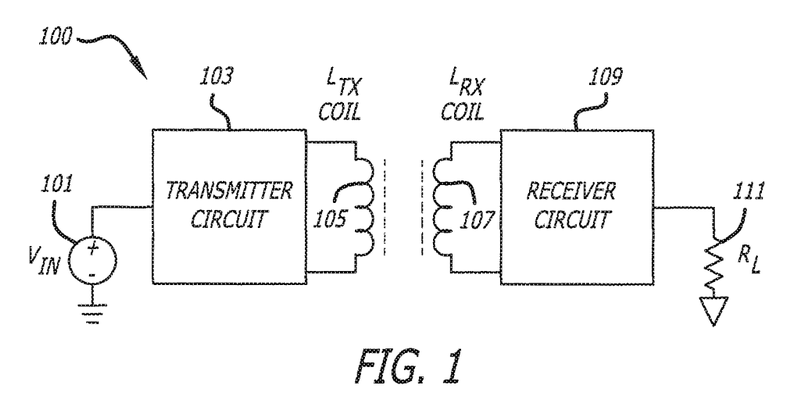
FIG. 1 is a block diagram of an example wireless power transfer system.

FIG. 1 is a block diagram of an example wireless power transfer system 100.

As illustrated in FIG. 1, the wireless power transfer system 100 may include a power source 101, a transmitter circuit 103, a transmitter coil 105, a receiver coil 107, a receiver circuit 109, and a load 111.

The power source 101 may be a source of AC or DC power. The transmitter circuit 103 may convert the source power into an AC signal at a frequency suitable for wireless power transmission. This AC signal may be delivered to the transmitter coil 105 which may be magnetically but wirelessly coupled to the receiver coil 107. The coupling may be air or another type of non-magnetic or non-conductive material. The receiver coil 107 may wirelessly receive the power from the transmitter coil 105. The receiver circuit 109 may convert the AC signal received by the receiver coil 107 into a regulated DC output voltage, which may then be delivered to the load 111.

Figure 2:
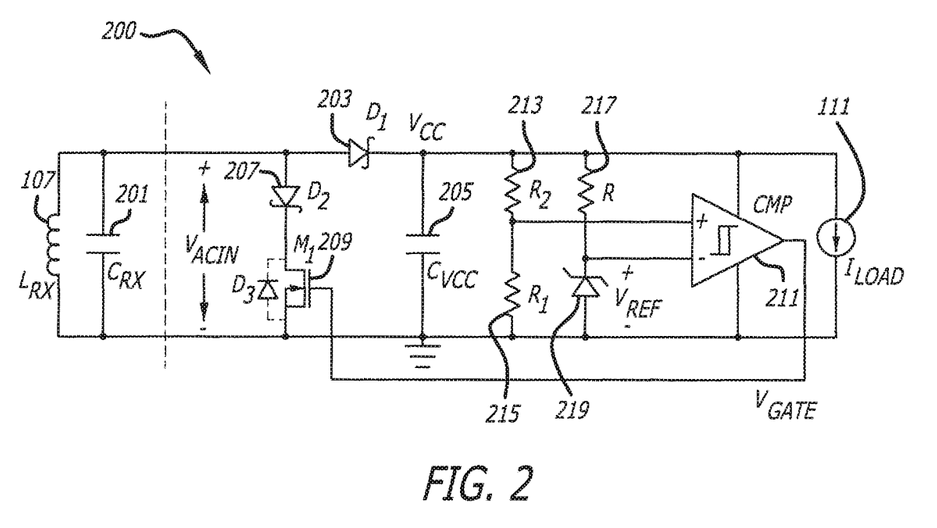
FIG. 2 illustrates an example circuit that implements the receive side of the wireless power transfer system illustrated in FIG. 1 employing an NMOS electronic switch to shunt excess power.

FIG. 2 illustrates an example circuit 200 that implements the receive side of the wireless power transfer system illustrated in FIG. 1 employing an NMOS electronic switch to shunt excess power. As illustrated in FIG. 2, a tuning capacitor 201 may be used in combination with the receiving coil 107 to create a resonant tank at the frequency of the power transmission from the transmitting coil 105.

The AC signal from the resonant tank may be rectified by a rectifier, such as a Schottky diode 203, then filtered by a filtering capacitance 205, and delivered to the load 111. The load 111 may be a battery charger connected to a battery, such as a battery charger and battery in a mobile phone, hearing aid, medical device, power tool, smart card, fitness device, battery-powered wearable, virtual reality headset, aviation headset, IOT (Internet of Things) client, portable military equipment, moving and/or rotating equipment, or any other type of load. The load may vary with time.

As indicated above, the coupling between the transmitter coil 105 and the receiver coil 107 can vary widely due to variations in their relative positions, such as variations in distance and/or orientation, during use. In turn, this can cause substantial deviations in the magnitude of the voltage that is delivered to the load 111, which may be undesirable.

To prevent this, a shunt switch, which in this example includes a Schottky diode 207 in series with an NMOS electronic switch 209 may be actuated by a controller that monitors the output voltage. The controller may include a comparator 211 which compares a scaled down version of the output voltage, developed by a voltage divider series resistor network made of resistors 213 and 215, with a reference voltage, developed by a series resistor 217 and a Zener diode 219. When the scaled down version of the output voltage exceeds the voltage across the Zener diode 219, the comparator 211 may send a signal to the gate of the NMOS electronic switch 209 that turns this switch on, thereby shunting the input power until the scaled down version of the output voltage drops below the voltage across the Zener diode 219.

Figure 3A:
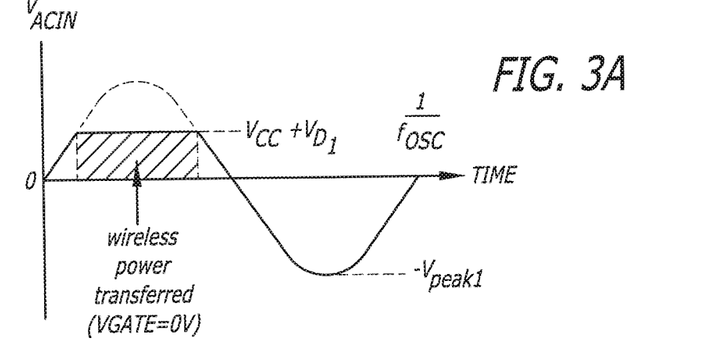
Figure 3B:
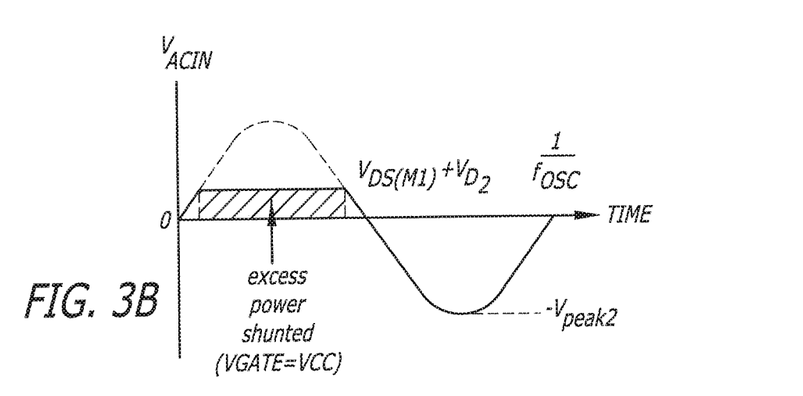
FIG. 3B illustrates the waveform when power is shunted.

FIGS. 3A and 3B illustrate examples of a waveform across the receiving coil 107 in the receive side of the wireless power transfer system illustrated in FIG. 2. FIG. 3A illustrates the waveform when no power is shunted, while FIG. 3B illustrates the waveform when power is shunted.

The shunting approach illustrated in FIG. 2, however, can create undesirable heat due to the internal resistance of the NMOS electronic switch 209 when it is on. The shunting approach illustrated in FIG. 2 also wastes energy.

Instead of configuring a switch to shunt excess power, an electronic switch may instead be configured in series with the input power source VACIN and to interrupt the power flow when the output voltage is too high (e.g., above the desired output voltage), thus eliminating undesirable heat and power loss. However, the coupling between the transmitter and receiver coils 105 and 107 can vary widely during use, causing the input voltage to correspondingly vary widely (e.g. by 100% or even more). This wide variation in input voltage can make it difficult to control such a series electronic switch in an effective manner.

Figure 4:
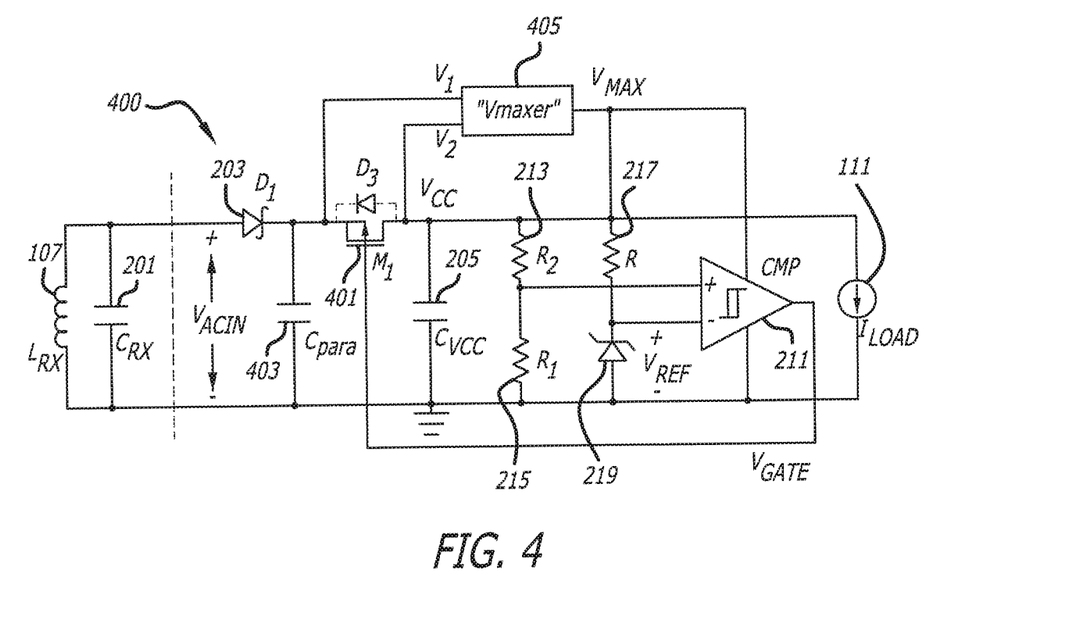
FIG. 4 illustrates an example of the receive side of a wireless power transfer system that uses a PMOS electronic switch in series with the input voltage to prevent excess output voltage and a switch controller that can effectively control this electronic switch, notwithstanding wide variations in input voltage, such as variations in excess of 100%.

FIG. 4 illustrates an example of the receive side 400 of a wireless power transfer system that uses a PMOS electronic switch 401 in series with the input voltage to prevent excess output voltage and a switch controller that can effectively control this switch, notwithstanding wide variations in input voltage, such as variations in excess of 100%.

As illustrated in FIG. 4, the components of the receive side of this wireless power transfer system may be the same as those illustrated in FIG. 2, except that the electronic switch 401 may be placed in series with the rectified input voltage, instead of in parallel as a shunt. A parasitic capacitance 403 may be present. The capacitance is designated as "parasitic" because it is stray or unwanted and not specifically designed into the application, nor required by it. It is included in the description here because it helps illustrate the point that when the switch is open, there is still rectification taking place (but only involving Cpara instead of Cpara+Cvcc) and a new higher voltage will be created across Cpara. It may be preferable in the application for Cpara to be much smaller than Cvcc so that, when the switch closes again, the resulting voltage goes to the lower voltage across Cvcc, and not the higher voltage across Cpara. To enable this series switch to function properly at the needed times, notwithstanding the wide variation in input voltage, a maximum voltage selector ("Vmaxer") circuit 405 may also be included in the depicted example.

The maximum voltage selector circuit 405 may receive two input voltages from the drain and source of the PMOS electronic switch 401 and may output the maximum of the two input voltages to power the comparator 211 and to connect to the series resistor 217.

Figure 5:
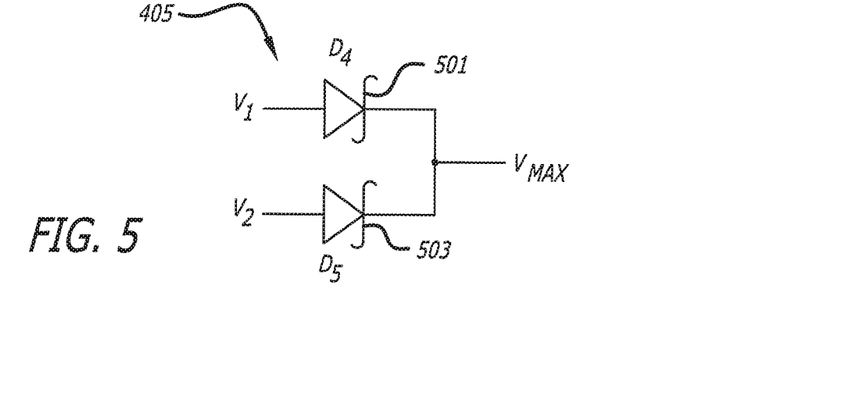
FIG. 5 illustrates an example of the maximum voltage selector ("Vmaxer") circuit illustrated in FIG. 4.

FIG. 5 illustrates an example of the maximum voltage selector circuit 405 illustrated in FIG. 4. As illustrated in FIG. 5, the maximum voltage selector circuit 405 may be implemented by a pair of Schottky diodes 501 and 503. The anodes of the two diodes may be the inputs to the maximum voltage selector circuit 405, while their cathodes may be connected together and serve as the output from the maximum voltage selector circuit 405.

Figure 6A:
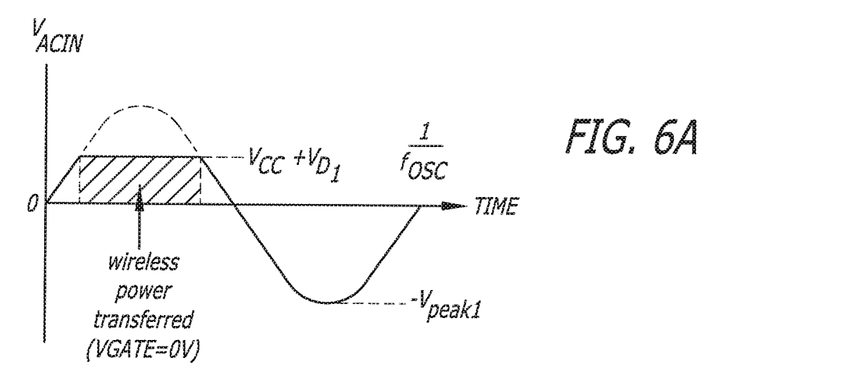
Figure 6B:
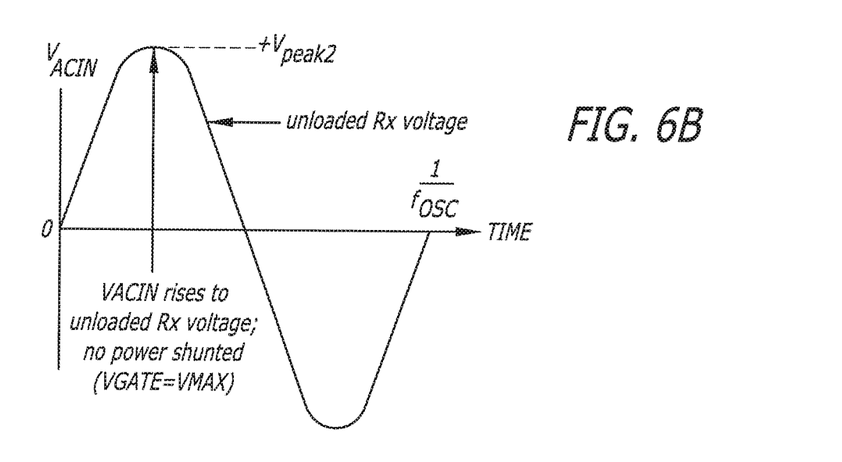
FIG. 6B illustrates the waveform when the PMOS electronic switch is open.

FIGS. 6A and 6B illustrate examples of a waveform across the receiving coil 107 in the wireless power transfer system illustrated in FIG. 4. FIG. 6A illustrates the waveform when the series PMOS electronic switch 401 is closed, while FIG. 6B illustrates the waveform when the series PMOS electronic switch 401 is open.

The implementation illustrated in FIG. 4 continues to provide a regulated output voltage, notwithstanding wide variations in the input voltage (e.g., more than 100%), without any shunting that generates heat and waste power.

Figure 7:
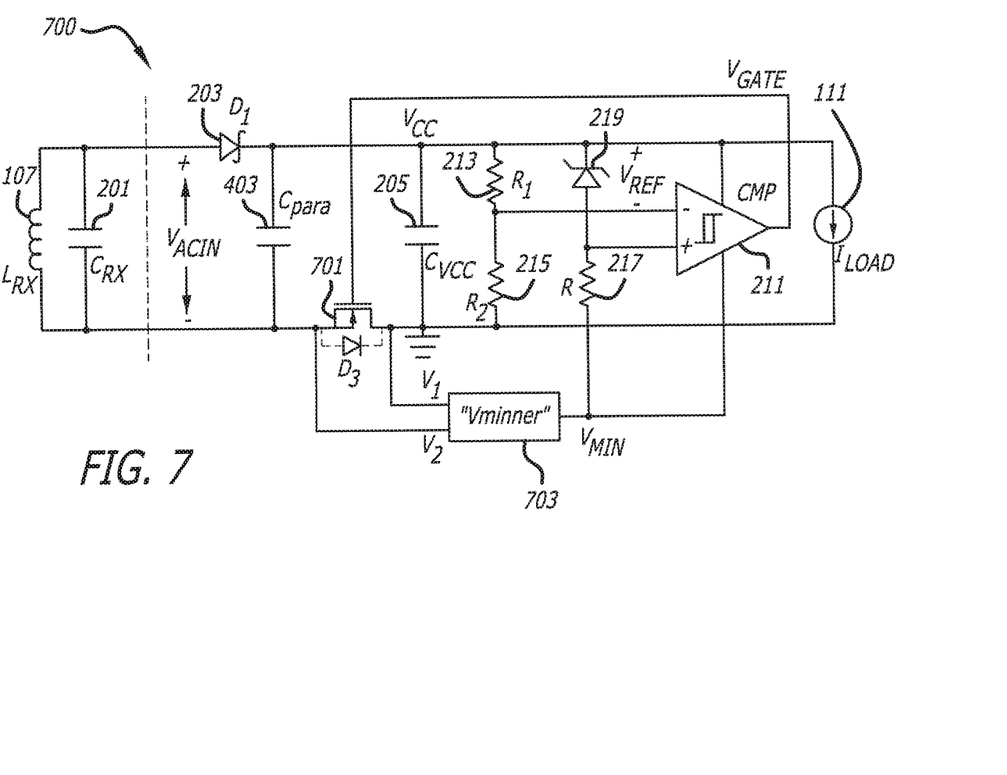
FIG. 7 illustrates an example of the receive side of a wireless power transfer system that uses an NMOS electronic switch in series with the input voltage to prevent excess output voltage and a switch controller that can effectively control this electronic switch, notwithstanding wide variations in input voltage, such as variations in excess of 100%.

FIG. 7 illustrates an example of the receive side 700 of a wireless power transfer system that uses an NMOS electronic switch 701 in series with the input voltage to prevent excess output voltage and a switch controller that can effectively control this switch, notwithstanding wide variations in input voltage, such as variations in excess of 100%. The implementation is functionally the same as the one shown in FIG. 4, except that the electronic switch 701 is an NMOS electronic switch (which can have a lower forward voltage drop) and is placed in the negative side of the supply line, rather than in the positive side. To facilitate this difference, a minimum voltage selector circuit 703 may be used instead. The positions of the resistor 217 and the Zener diode 219 may also be reversed.

The minimum voltage selector circuit 703 may receive two input voltages from the drain and source of the NMOS electronic switch 701 and may output the minimum of the two to serve as the negative power rail for the comparator 211 and to connect to the series resistor 217.

Figure 8:
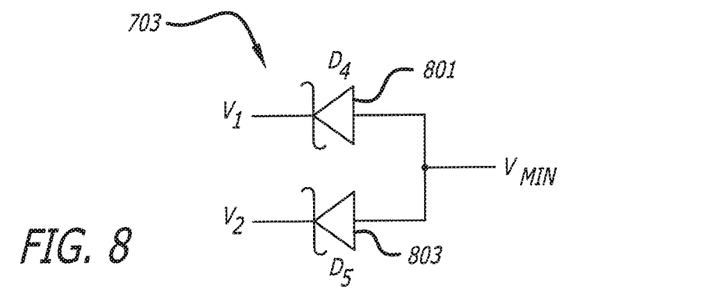
FIG. 8 illustrates an example of the minimum voltage selector ("Vminner") circuit illustrated in FIG. 7.

FIG. 8 illustrates an example of the minimum voltage selector circuit 703 illustrated in FIG. 7. As illustrated in FIG. 8, the minimum voltage selector circuit 703 may be implemented by a pair of Schottky diodes 801 and 803. The cathodes of the two diodes may be the inputs to the minimum voltage selector circuit 703, while their anodes may be connected together and serve as the output from the minimum voltage selector circuit 703.

Figure 9A:
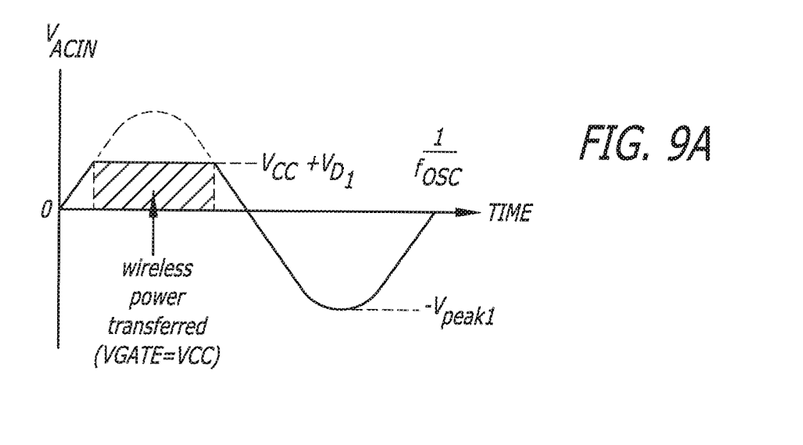
Figure 9B:
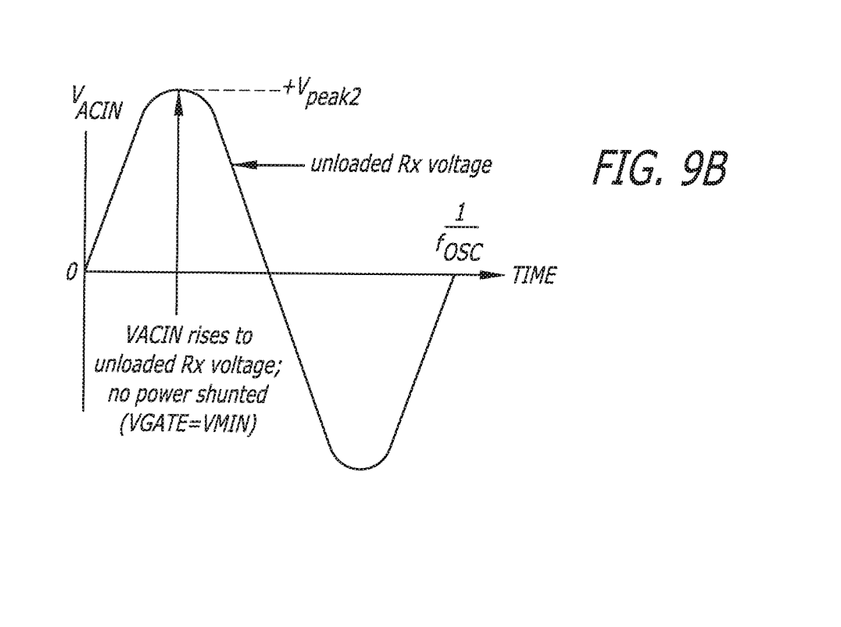
FIG. 9B illustrates the waveform when the NMOS electronic switch is open.

FIGS. 9A and 9B illustrate examples of a waveform across the receiving coil 107 in the receive side of the wireless power transfer system illustrated in FIG. 7. FIG. 9A illustrates the waveform when the NMOS electronic switch 701 is closed, while FIG. 9B illustrates the waveform when the NMOS electronic switch 701 is open.

The components, steps, features, objects, benefits, and advantages that have been discussed are merely illustrative. None of them, nor the discussions relating to them, are intended to limit the scope of protection in any way. Numerous other implementations are also contemplated. These include implementations that have fewer, additional, and/or different components, steps, features, objects, benefits, and/or advantages. These also include implementations in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various implementations to streamline the disclosure. This method of disclosure should not be interpreted as requiring claimed implementations to require more features than are expressly recited in each claim. Rather, as the following claims reflect, inventive subject matter lies in less than all features of a single disclosed implementation. Thus, the following claims are hereby incorporated into the detailed description, with each claim standing on its own as separately claimed subject matter.

The invention claimed is:

1. A circuit in a wireless power transfer system that receives a wirelessly-generated input voltage at an input and produces a constant DC voltage at an output to drive a load, the circuit comprising:
    an electronic switch connected in series between the input and the output;
    a comparator, configured to receive a representation of the wirelessly generated input voltage and a reference, and to provide an output to control conduction of the electronic switch, wherein the conduction of the electronic switch is configured to provide the constant DC voltage; and
    a voltage selector circuit configured to receive two input voltages and to provide one of the two input voltages as a supply voltage of the comparator.

2. The circuit of claim 1 wherein the two input voltages are the voltages on each side of the electronic switch.

3. The circuit of claim 1, wherein the voltage selector circuit is a maximum voltage selector circuit; and
    wherein the output of the maximum voltage selector circuit connects to one of the power inputs of the comparator.

4. The circuit of claim 3 wherein the electronic switch is a PMOS electronic switch.

5. The circuit of claim 1, wherein the voltage selector circuit is a minimum voltage selector circuit; and
    wherein the electronic switch is an NMOS electronic switch.

6. The circuit of claim 1 wherein the input voltage is an AC voltage and the circuit further comprises a rectifier that rectifies the input voltage.

7. The circuit of claim 6 further comprising a filter capacitance coupled across the load to filter and to a first node of the electronic switch, the filter capacitor configured to filter the rectified AC input voltage.

8. The circuit of claim 7 further comprising a second capacitance coupled to a second node of the electronic switch, the second capacitance configured to filter the rectified AC input voltage.

9. The circuit of claim 1 further comprising a rectifier in series with the electronic switch.

10. A wireless power transfer system for wirelessly transmitting and receiving power comprising:
   a transmitting coil that wirelessly transmits the power;
   a receiving coil magnetically but wirelessly coupled to the transmitting coil that wirelessly receives the power and generates an AC input voltage;
   a rectifier that rectifies the AC input voltage;
   a capacitance that filters tile rectified AC input voltage;
   an electronic switch connected in series between tile rectified AC input voltage and an output;
   a load connected to the output;
   a comparator configured to open and close the electronic switch so as to cause the output to be at a constant DC voltage, notwithstanding variations in the load; and
   a voltage selector circuit configured to receive two input voltages and to provide one of the two input voltages as a supply voltage of the comparator.

11. The wireless power transfer system of claim 10 wherein the voltage selector circuit comprises:
   a maximum voltage selector circuit that receives two input voltages and outputs the higher of the two input voltages; or
   a minimum voltage selector circuit that receives two input voltages and outputs the lower of the two input voltages.

12. The wireless power transfer system of claim 11 wherein the two input voltages are the voltages on each side of the electronic switch.

13. The wireless power transfer system of claim 11 wherein the output of the maximum voltage selector circuit or the minimum voltage selector circuit powers the comparator.

14. The wireless power transfer system of claim 11 wherein the system includes the maximum voltage selector circuit and the electronic switch is a PMOS electronic switch.

15. The wireless power transfer system of claim 11 wherein the circuit includes the minimum voltage selector circuit and the electronic switch is an NMOS electronic switch.

16. The wireless power transfer system of claim 10 wherein the load includes a battery charger connected to a battery.

17. The wireless power transfer system of claim 10 wherein the capacitance includes a first capacitance coupled to a first node of the electronic switch and a second capacitance coupled to a second node of the electronic switch.

18. A circuit for a wireless power transfer system that receives a wirelessly-generated input voltage at an input and produces a constant DC voltage at an output to drive a load, the circuit comprising:
   switch means connected in series between the input and the output for controllably opening and closing a connection between the input and the output;
   controller means for causing the switch means to open and close so as to cause the output to be at the constant DC voltage; and
   means for receiving two input voltages and for providing one of the two input voltages as a supply voltage of the controller means.

19. The circuit of claim 18, wherein the means for receiving two input voltages includes:
   a first diode configured to receive a first input voltage of the two input voltages; and
   a second diode configured to receive a second input voltage of the two input voltages.

20. The circuit of claim 18, wherein the means for receiving two input voltages includes one of a maximum voltage selector circuit or a minimum voltage selector circuit.

21. A wireless power transfer system for wirelessly transmitting and receiving power comprising:
   transmitter means for wirelessly transmitting the power;
   receiver means magnetically but wirelessly coupled to the transmitting means for wirelessly, receiving the power and for generating an AC input voltage;
   rectifier means for rectifying the AC input voltage;
   capacitance means for filtering the rectified AC input voltage;
   switch means connected in series between the AC input voltage and an output for controllably opening and closing a connection between the AC input voltage and the output;
   load means for providing a load connected to the output;
   controller means for opening and closing the switch means so as to cause the output to be at a constant DC voltage, notwithstanding variations in the load; and
   a voltage selector means to provide one of two input voltages as a supply voltage of the controller means, the two input voltages derived from a voltage across the switch means.

22. The wireless power transfer system of claim 21, wherein the voltage selector means includes:
   a first diode configured to receive a first input voltage of the two input voltages; and
   a second diode configured to receive a second input voltage of the two input voltages.

23. The wireless power transfer system of claim 22, wherein the switch means includes a PMOS transistor; and
   whereon the voltage selector means includes a maximum voltage selector circuit.

24. The wireless power transfer system of claim 22, wherein the switch means includes a NMOS transistor; and
   wherein the voltage selector means includes a minimum voltage selector circuit.

\* \* \* \* \*